United States Patent
Chakraborty et al.

(10) Patent No.: US 10,785,646 B2
(45) Date of Patent: Sep. 22, 2020

(54) USE OF GENERATIVE ADVERSARIAL NETWORKS (GANS) FOR ROBUST TRANSMITTER AUTHENTICATION

(71) Applicant: International Business Machines Corporation, Armonk, NY (US)

(72) Inventors: Supriyo Chakraborty, White Plains, NY (US); Bodhisatwa Sadhu, Fishkill, NY (US); Bong Jun Ko, Harrington Park, NJ (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 16/111,973

(22) Filed: Aug. 24, 2018

(65) Prior Publication Data

US 2020/0068398 A1    Feb. 27, 2020

(51) Int. Cl.
    *H04L 29/06*        (2006.01)
    *H04W 12/06*        (2009.01)
    *H04B 1/04*         (2006.01)

(52) U.S. Cl.
    CPC .......... *H04W 12/06* (2013.01); *H04B 1/0475* (2013.01)

(58) Field of Classification Search
    CPC .............................. H04W 12/06; H04B 1/0475
    See application file for complete search history.

(56) References Cited

U.S. PATENT DOCUMENTS

| | | | |
|---|---|---|---|
| 10,007,866 B2 * | 6/2018 | Criminisi | G06K 9/6257 |
| 2017/0365038 A1 | 12/2017 | Denton et al. | |
| 2018/0075581 A1 * | 3/2018 | Shi | G06N 3/084 |
| 2018/0336471 A1 * | 11/2018 | Rezagholizadeh | G06N 3/0454 |
| 2019/0080205 A1 * | 3/2019 | Kaufhold | G06K 9/6257 |
| 2019/0251167 A1 * | 8/2019 | Krishnapura Subbaraya | G06F 40/30 |
| 2019/0354629 A1 * | 11/2019 | Zavesky | G06N 3/08 |
| 2019/0392304 A1 * | 12/2019 | Aliper | G06N 3/08 |
| 2020/0042801 A1 * | 2/2020 | Auner | G06K 9/00805 |

OTHER PUBLICATIONS

Konstantinos Bousmalis, Nathan Silberman, David Dohan, Dumitru Erhan, Diplip Krishnan "Unsupervised Pixel-Level Domain Adaptation with Generative Adversarial Networks" [retrieved Aug. 2018].

Zhu, Chenxiao, et al. "Tensor-Generative Adversarial Network with Two-dimensional Sparse Coding: Application to Real-time Indoor Localization." arXiv preprint arXiv:1711.02666 (Nov. 2017). https://arxiv.org/pdf/1711.02666.pdf.

Nguyen, N.T., Zheng, G., Han, Z. and Zheng, R., Apr. 2011. Device fingerprinting to enhance wireless security using nonparametric Bayesian method. In INFOCOM, 2011 Proceedings IEEE (pp. 1404-1412). IEEE.

(Continued)

*Primary Examiner* — Sher A Khan
(74) *Attorney, Agent, or Firm* — Harrington & Smith (57) ABSTRACT

A method is provided for transmitter authentication including generating a noise vector using a generative adversarial network generator model, wherein a signature of a first transmitter is embedded into a signal output by the first transmitter based at least on the noise vector; and using the signature to identify the first transmitter.

14 Claims, 7 Drawing Sheets

---

801 — GENERATING A NOISE VECTOR USING A GENERATIVE ADVERSARIAL NETWORK GENERATOR, WHEREIN A SIGNATURE OF A FIRST TRANSMITTER IS EMBEDDED INTO A SIGNAL BASED AT LEAST ON THE NOISE VECTOR

803 — USING THE SIGNATURE TO IDENTIFY THE FIRST TRANSMITTER (56) References Cited

OTHER PUBLICATIONS

Brik, V., Banerjee, S., Gruteser, M. and Oh, S., 2008. Wireless Device Identification with Radiometric Signatures. MobiCom'08, Sep. 14-19, 2008, San Francisco, California, USA.
Scanlon, P., Kennedy, I.O. and Liu, Y., 2010. Feature extraction approaches to RF fingerprinting for device identification in femtocells. Bell Labs Technical Journal, 15(3), pp. 141-151. [retrieved Aug. 2018].

\* cited by examiner

USE OF GENERATIVE ADVERSARIAL NETWORKS (GANS) FOR ROBUST TRANSMITTER AUTHENTICATION

BACKGROUND

Various example embodiments generally relate to communication systems, and more specifically relate to authentication of transmitters in communication systems.

In a typical communication system, a transmitter imparts a unique hardware-specific signature into a message signal before it transmits it over a wireless channel. The signature consists of hardware specific non-linear transformations of the signal and can potentially be used to authenticate the transmitter. After being transmitted, the signal undergoes linear transformation via additive noise effects introduced by the channel. When the signal is received at a receiver, the incoming waveform undergoes further non-linear transformations due to the receiver hardware before being decoded to the original message.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

SUMMARY

This section is meant to be exemplary and not meant to be limiting.

According to an example of an embodiment, a method is provided for transmitter authentication, the method including: generating a noise vector using a generative adversarial network generator model, wherein a signature of a first transmitter is embedded into a signal output by the first transmitter based at least on the noise vector; and using the signature to identify the first transmitter.

According to another example of an embodiment, a computing system is provided including: one or more memories comprising computer-readable code; one or more processors, wherein the one or more processors are configured, in response to execution of the computer-readable code, to cause the computing system to at least: generate a noise vector using a generative adversarial network generator model, wherein a signature of a first transmitter is embedded into a signal output by the first transmitter based at least on the noise vector; and use the signature to identify the first transmitter.

According to another example of an embodiment, a computer program product for transmitter authentication is provided, the computer program product including a computer readable storage medium having program instructions embodied therewith, the program instructions executable by a device to cause the device to: generate a noise vector using a generative adversarial network generator model, wherein a signature of a first transmitter is embedded into a signal output by the first transmitter based at least on the noise vector; and use the signature to identify the first transmitter.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

A 'Generative Adversarial Network' (GAN) generally refers to a network includes a generator model G and a discriminator model D. The discriminator model D may be initially trained to distinguish between actual data and fake data that could be drawn from another random distribution. This initial training of the discriminator model D is not mandatory, and the discriminator model D could be trained in step with the generator model G. Often for reasons of efficiency and stability of training, a trained discriminator model D is used initially and training is continued with the generator model G. The generator model G may be initialized with a random distribution of data samples (for example, a normal distribution). During training of the generator model G, a fake sample (or a batch of fake samples) is randomly drawn from the generator G distribution and is passed to the discriminator model D. An actual data sample (or a batch of actual data samples) are also passed to the discriminator model D. The discriminator model D in turns tries to discriminate between these samples as true or fake. A 'true sample' is one drawn from the actual data and a 'fake sample' is one generated by G. Depending on the output of discriminator model D, a cost function is minimized at the generator model G. As such, the parameters (e.g. model weights) of the generator model G are adjusted, which in turn allows the generator model G to better discriminate between true and fake samples.

The parameters of the random distribution are updated until the discriminator model D is unable to distinguish between the true and fake samples with a probability greater than some threshold (such as 50% for example), at which stage the generator model is said to suitably mimic the distribution of the true data. The discriminator model D may be allowed to continually train using both the true and fake samples to enhance its discriminatory power. The training of the generator and discriminator training may be thought of as a game being played between two players (i.e. the discriminator D and the generator G). D gets a point when it is able to correctly distinguish between a true and fake sample. The goal of the G is to generate fake samples that are as close as possible to the true samples, such that the D is unable to distinguish between them. If G is able to beat D, it wins. So, every time D is able to distinguish, G updates its weights, so that it can go ahead and generate better fake samples. Thus, here the parameters imply the parameters of the generator model G.

Adversarial example synthesis generally refers to a process of adding 'noise' to data samples such that the noisy data is almost perceptually indistinguishable from the true data but is misclassified by a trained model. Targeted attacks refer to attacks in which the noisy data is misclassified by the discriminator model but to a specific pre-determined class. Non-targeted attacks are said to be successful when the noisy samples are simply misclassified. The term 'attack' refers to crafting a data sample that is misclassified by a trained model. Typically, it is assumed that the classification model has been pre-trained (and fixed). The test data sample, is then gradually perturbed by adding noise (hence referred to as a 'noisy sample'), until it is misclassified by the model. The noise added is small in magnitude and the distortion to the test sample is typically imperceptible to the human eye.

Various example embodiments herein describe techniques for robust transmitter authentication that use generative adversarial networks. Additional description of these techniques is presented after a system into which the exemplary embodiments may be used is described.

Figure 1:
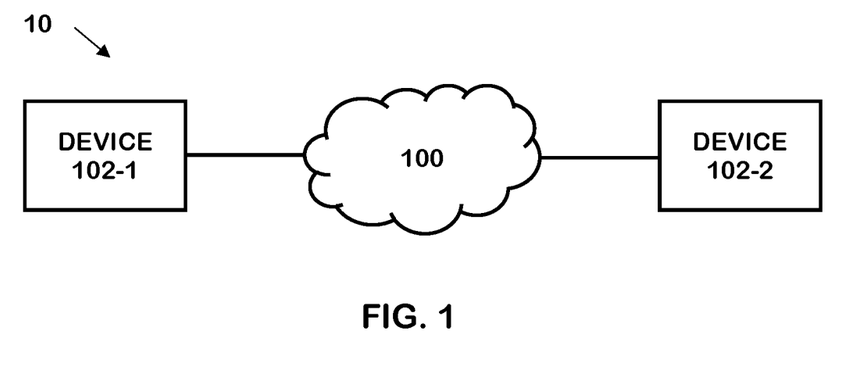
FIG. 1 is a block diagram of one possible and non-limiting exemplary system in which the exemplary embodiments may be practiced.

FIG. 1 is a block diagram of one possible and non-limiting exemplary system in which the exemplary embodiments may be practiced. The system 10 includes devices 102-1, 102-2 that can communicate with each other, and with other computers, via a network 100, where the network 100 may in general comprise one or more component networks and/or internetworks, including the Internet, and may include wired and/or wireless network links. For simplicity, the example shown in FIG. 1 includes two devices 102-1, 102-2. In particular, the devices 102-1, 102-2 may send and/or receive messages with each other or with other computers. As an example, device 102-1 may transmit a message via a transmitter using a unique authentication signal to device 102-2 (or vice versa) in accordance with a GAN-style framework as discussed in more detail below. The device that receives the message can verify the authenticity of the transmitter that sent the message based on the unique authentication signal. Each device 102-1, 102-2 of system 10 may provide functionality for communicating in accordance with the GAN-style framework, such as providing functionality for generating the authentication signal and/or functionality for verifying the authenticity of the transmitter sending such a signal, for example, as described in more detail below.

FIG. 1 is also representative of a scenario where one or more devices 102-1 (such as one or more computers/servers for example) represent a training device that trains one or more network models in accordance with various example embodiments as described herein (such as neural network models as used in a GAN-framework for example). In this case, the one or more devices 102-1 may use and/or distribute the trained models to other devices such as device 102-2 (such as via network 100).

Functionality of devices 102-1, 102-2 of the GAN-style framework may be implemented by logic embodied in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types.

Figure 2:
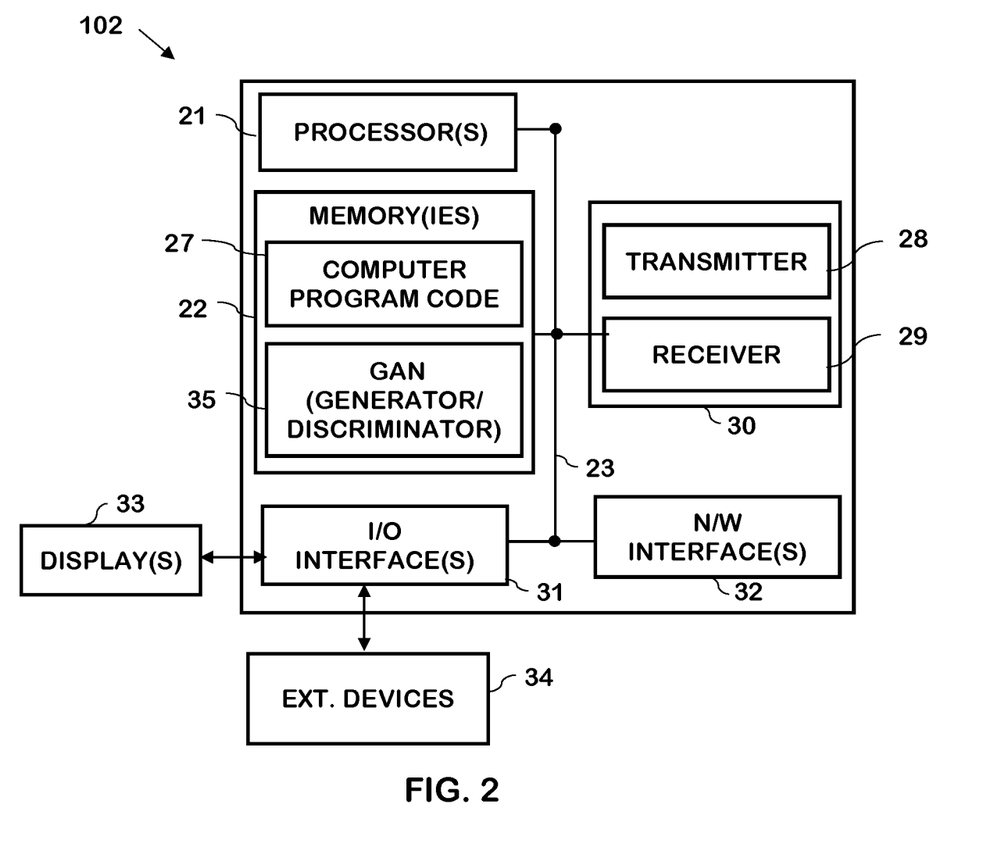
FIG. 2 is a block diagram of an example device in the system shown in FIG. 1.

FIG. 2 is a block diagram of an exemplary apparatus for implementing a device of system 10. The apparatus is shown in the form of device 102. The components of device 102 may include one or more processors 21, one or more memories 22, one or more transceivers 30, and one or more buses 23 that couple various system components including memory(ies) 22 to processor(s) 21. Each of the one or more transceivers 30 may include a receiver 29 and/or transmitter 28. The one or more transceivers 30 may be connected to one or more antennas (not shown in FIG. 2). Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Device 102 may include a variety of computer readable media. Such media may be any available media that is accessible by device 102 including volatile and non-volatile media, and removable and non-removable media. For example, memory(ies) 22 can include computer readable media in the form of volatile memory, such as random access memory (RAM) and/or cache memory. Device 102 may further include other removable/non-removable, volatile/non-volatile computer system storage media. By way of example only, the computer system storage can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory(ies) 22 may include computer program code 27 having one or more program modules that are configured to carry out functions of various example embodiments. As an example, computer program code 27 may be stored in memory(ies) 22, which may include computer program code for an operating system, one or more application programs, other program modules, and program data. According to some embodiments, memory(ies) 22 may also store one or more trained discriminator models and/or trained generator models 35 in accordance with a GAN-style framework as discussed in more detail below. Alternatively, or additionally, the one or more trained discriminator models and/or trained generator models 35 may be implemented by logic embodied in hardware (e.g. circuitry). Each of the operating systems, one or more application programs, other program modules, and program data, or some combination thereof, may carry out various functions and/or methodologies in accordance with exemplary embodiments.

Device 102 may also communicate with one or more external devices 34 such as a keyboard, a pointing device, a display 33 and/or the like; one or more devices that enable a user to interact with device 102; and/or any devices (e.g., network card, modem, etc.) that enable device 102 to communicate with one or more other devices. Such communication can occur, for example, via Input/Output (I/O) interfaces 31. Also, device 102 may communicate with one or more networks such as a local area network (LAN), a general wide area network (WAN), and/or a public network (e.g., the Internet) via network adapter 32. As depicted, network adapter 32 communicates with the other components of device 102 via bus 23. It should be understood that although not shown, other hardware and/or software components could be used in conjunction with device 102. Examples include, but are not limited to: microcode, device drivers, redundant processing units, external disk drive arrays, RAID systems, tape drives, and data archival storage systems, etc.

It is noted that, in some situations, all of the components shown for device 102 in FIG. 2 are not required. As an example, device 102 may correspond to an IOT device that includes a sensor (not shown in FIG. 2) and a transmitter 28 without one or more of the other components shown in FIG. 2 (e.g. processors, memory(ies). In such an example, the device 102 may include a hardcoded output of a GAN generator function (e.g. using some circuitry) in accordance with exemplary embodiments.

Figure 3:
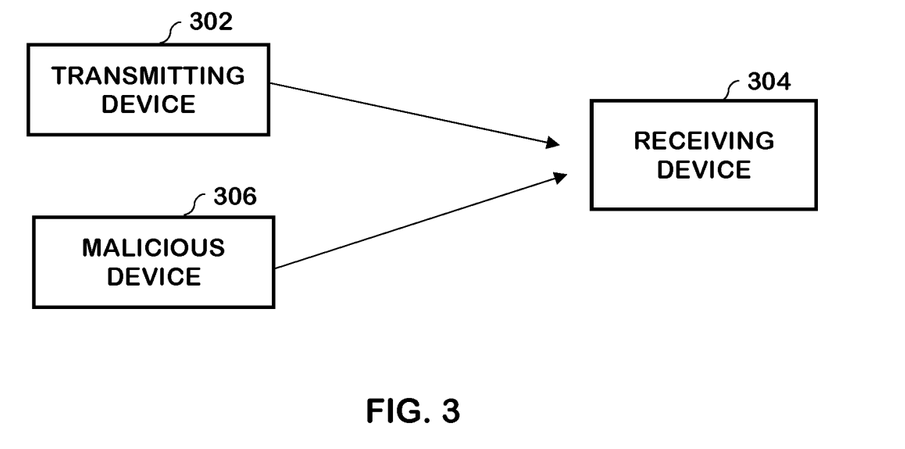
FIG. 3 shows an example of communications between devices.

Referring now to FIG. 3, this figure shows an example of 'signal spoofing'. In this example, a user of a transmitting device 302 wants to transmit a signal to a receiving device 304 over a communication channel and desires the signal to be authenticated successfully. When transmitting device 302 transmits a signal using a transmitter, receiving device 304 may use the signature in the received signal to authenticate that the message is indeed from transmitting device 302. In some circumstances, there may be another malicious user of another device, which in FIG. 3 is malicious device 306, eavesdropping on the communication between transmitting device 302 and receiving device 304. Malicious device 306 could then attempt to imitate the signature in the signal sent by transmitting device 302. It is noted that imitating the signature is generally equivalent to learning the non-linear signature introduced in the message signal. Malicious device 306 may then send messages to receiving device 304 with the embedded signature, thus compromising the authentication mechanism. This type of signal imitation may referred to as 'signal spoofing'. Signal spoofing may be used to launch man-in-the-middle attack where a malicious actor (i.e. malicious device 306 in the example shown FIG. 3) inserts herself into a conversation between two parties (e.g. transmitting device 302 and receiving device 304), and may impersonate parties and gains access to information that the two parties were trying to send to each other without either outside party knowing until it is too late.

Although encryption may help prevent problems such as signal spoofing, the rate at which the signal values are generated makes it difficult to encode and also decode without dropping samples. The delay introduced by encryption schemes is often too high for it to be a useful in some applications. Moreover, encryption can be too expensive in terms of power consumption for low power devices, such as devices (e.g. low power sensors) in an internet of things (JOT) scenario for example. In order to save power, various example embodiments provide simple modulation schemes with no encryption while maintaining security.

Figure 4:
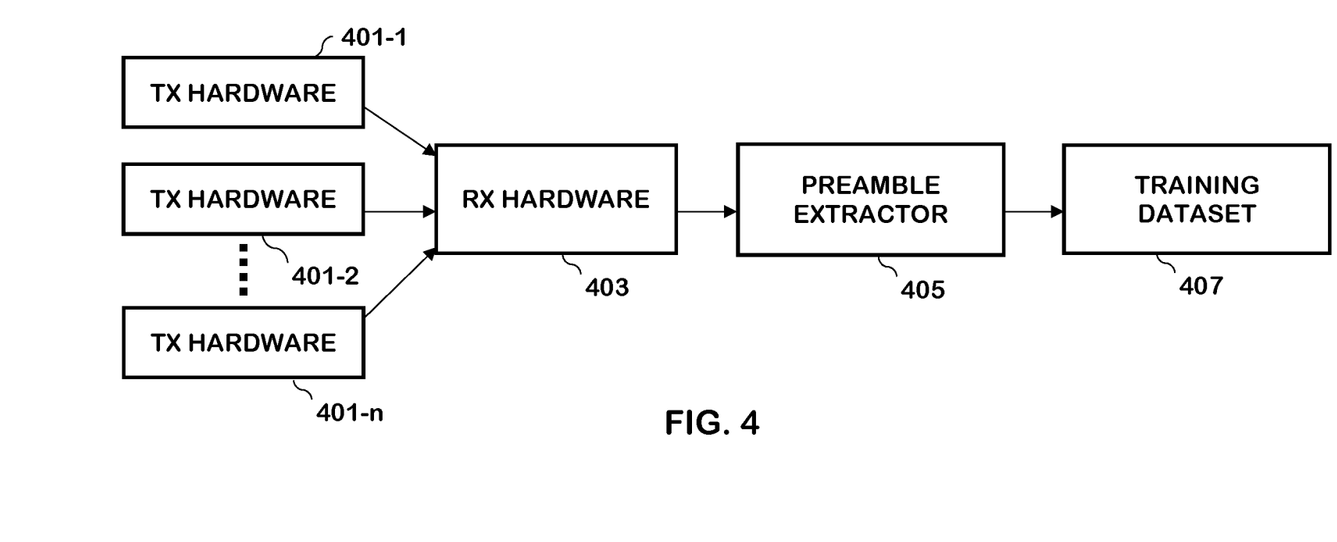
FIG. 4 shows an example embodiment of the subject matter described herein.

Referring now to FIG. 4, this figure shows a non-limiting example of collecting data for a training dataset in accordance with an example embodiment. In this example, multiple, different transmitters (i.e. TX hardware 401-1, 401-2, . . . , 401-*n*) transmit messages to RX hardware 403, and the preamble extractor 405 then extracts preambles from each of the messages, and the data is labeled and stored in training dataset 407. In this way, the training dataset includes labeled training data for each of the different transmitters that can be used to train another transmitter as described in more detail below.

According to some examples, a training dataset can be formed based on a handshake protocol. As part of this protocol, each trainmaster (e.g. TX hardware 401-1, 401-2, . . . , 401-*n*) each transmitter is required to transmit from a common set of messages (such as a set of transmission preambles as a non-limiting example), where the set is pre-determined and agreeable to all parties. Since, each transmitter transmits the same message the distortion in the received messages can be attributed to noise and transmitter specific non-linearities (that form the signature of the transmitters). The transmissions from all the transmitters during this handshake phase may form the training dataset. The same set of common messages may also be used to generate the unique signature pattern at a transmitter. In this way, the set of messages may be referred to as a set of training messages.

Figure 5:
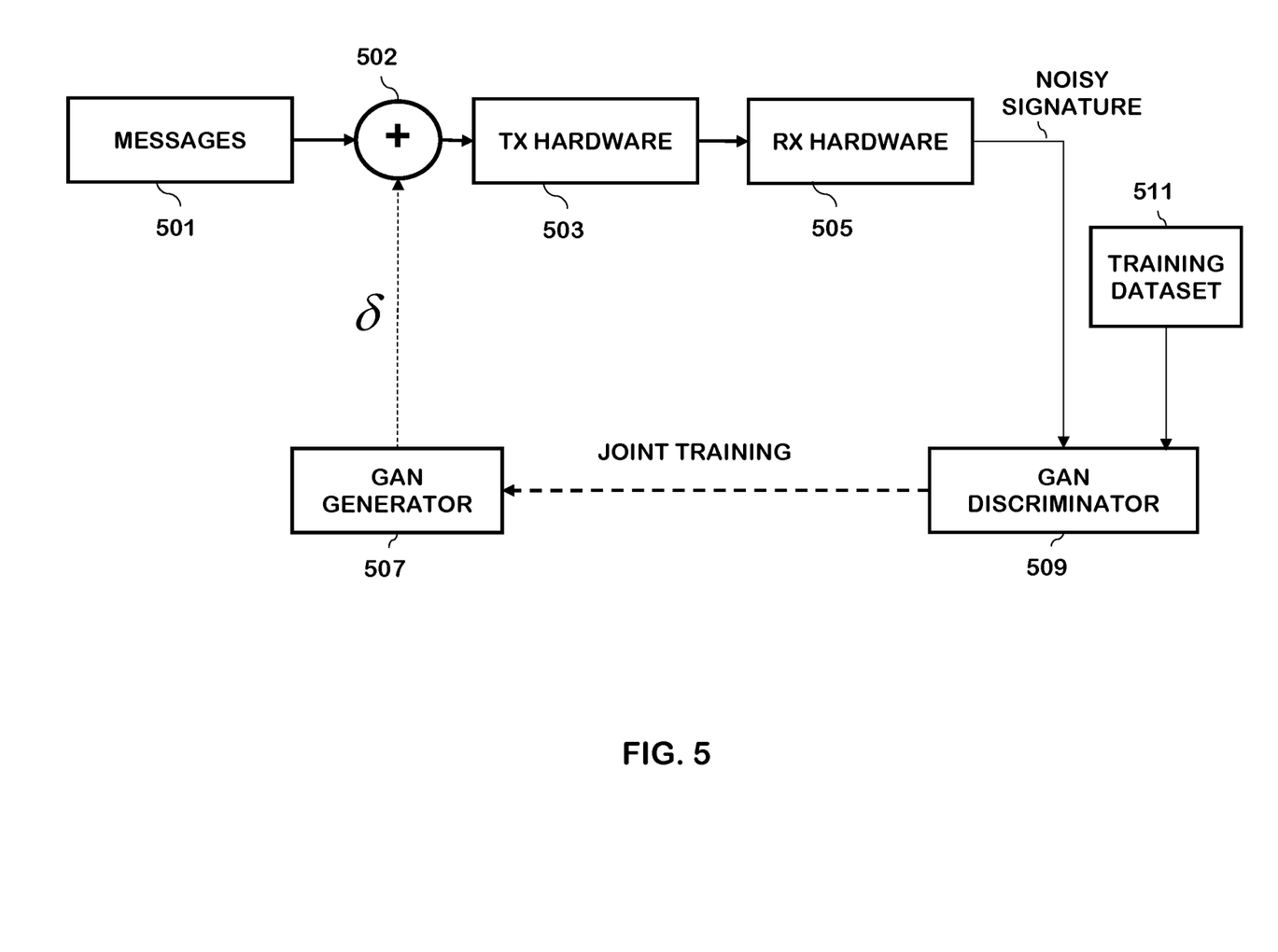
FIG. 5 shows another example embodiment of the subject matter described herein.

Referring now to FIG. 5, this figure shows an overview of a GAN-style framework in accordance with one example embodiment. In this example, a GAN discriminator 509 and a GAN generator 507 are jointly trained. The GAN discriminator 509 and GAN generator 507 are trained specifically for TX Hardware 503. More specifically, the GAN discriminator 509 is trained to distinguish between signals that are sent by TX hardware 504 and signals that are sent by other transmitters. Training the GAN discriminator 509 may be accomplished at least partly upon labelled data from a training dataset 511. The data from the training dataset 511 is provided as inputs to the discriminator model 509, where each input is known to be from a specific transmitter. The TX hardware 503 may also transmit signals that are received by RX hardware 505, which are provided as input to the GAN discriminator 509. Namely, one of the messages 501 is provided to the TX hardware 509, the TX hardware 503 transmits the signal to RX hardware 505, and then the signal output by RX hardware 505 is provided to the GAN discriminator 509. The messages 501 may correspond to a set of training messages, for example. In this way, the GAN discriminator 509 is initially trained to distinguish between 'real' signals sent by TX hardware 503 (i.e. signals generated by the TX Hardware 503 without added noise) and signals in the training dataset 511 that were known to be transmitted from other transmitters. As a non-limiting example, the training dataset 511 may correspond to training dataset 407, in which case the GAN discriminator 509 is trained to distinguish between signals sent from TX hardware 503 and signals known to be sent from TX hardware 401-1, 401-2, . . . , 401-*n*.

Additionally, 'enhanced' signals may be transmitted from TX hardware 503 (i.e. signals generated by adding noise from the GAN generator 507). More specifically, the GAN generator 507 generates noise 6 that is added 502 to one of the messages 501. This combined signal is then input to TX hardware 503. The TX hardware 503 introduces non-linearities in both the signal and the noise generated by the GAN generator 507. For example, the non-linearities may be due to a power amplifier and/or frequency mixer of the TX hardware 503. In this way, the noise 6 acts as a noisy signature of the TX hardware 503. The GAN generator 507 and GAN discriminator 509 are jointly trained such that the GAN discriminator 509 maximizes accuracy of distinguishing between enhanced signals of TX hardware 503 and signals from other transmitters, and the GAN generator 507 finds noise (6) that minimizes the signal distortion while still allowing the GAN discriminator to distinguish between other transmitters. The joint training is an iterative process, where the GAN generator 507 generates noise samples to probe the GAN discriminator 509.

With each iteration, further information is provided so that the GAN generator 507 can generate further noise samples so that the signal distortion is minimized while still allowing the discriminator to distinguish between the TX hardware 503 and other transmitters. This may be achieved, for example, by moving in a direction of the gradient of the GAN generator 507 cost function. Any suitable cost function may be used, such as a Cross Entropy function. This is somewhat similar to targeted attack synthesis, where noise is added such that the new samples are classified as the targeted label. The GAN may be considered trained when the generator model can synthesize noise that is small enough for samples of a class to have bounded distortion but large enough to ensure that the noisy samples are right at the class boundary.

In other words, the GAN generator 507 is trained to generate the right amount of noise, which, after passing through the non-linearities strengthens the uniqueness of the signature corresponding to TX hardware 503. This pattern would be impossible to replicate at another hardware due to the limited digital to analog converter resolution, and hence acts as a device authentication mechanism. Moreover, by bounding the magnitude of the noise vector it can be guaranteed that the noisy samples are in the neighborhood of the original samples.

It is noted that there exists a set of all signatures that can be created by TX hardware 503 using different noise inputs, and there also exists a set of all signatures that can be created by another transmitter using different noise inputs. These two sets may likely have significant overlap. During the learning process, the GAN discriminator 509 learns a set of unique signatures, such as the set of unique signatures that can be created by TX hardware 503 that cannot be created by other transmitters using any noise input.

In some example embodiments, this GAN based approach may be repeated using different generator models (e.g. another GAN generator model associated with a different transmitter) which allows the GAN discriminator 509 to rapidly gain accuracy in recognizing the unique signatures of TX hardware 503 that cannot be replicated by any of the other generator models that do not have access to the unique hardware non-linearities of TX hardware 503. In this way, a generator model can be thought of as a transformation function, that takes as input samples from a random distribution (e.g., a uniform distribution, Gaussian distribution) and transforms them such that they "look" statistically similar to the samples drawn from a true distribution. In some examples, different transformation functions may be used, which in this case means different generator models, each with its own ability to generate fake samples closer or further from the true distribution.

Figure 6:
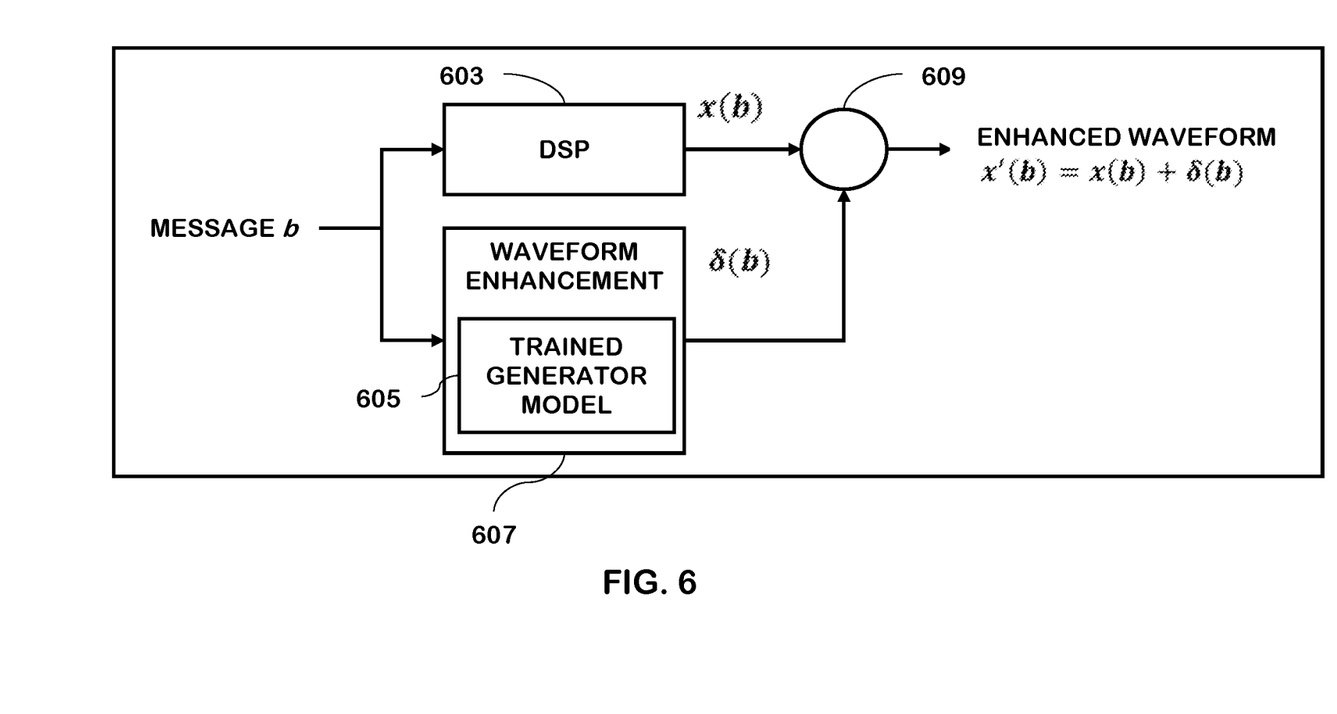
FIG. 6 shows another example embodiment of the subject matter described herein.

FIG. 6 shows a process for generating an enhanced waveform in accordance with an example embodiment. The process shown in FIG. 6 may be performed, for example, by a transmitting device (such as device 102). In this example, a message b is provided as input to a digital signal processor (DSP) 603 which outputs a signal x(b). The message is also provided to a waveform enhancement component 607 which includes a trained GAN generator model 607 (such as described above for example). The waveform enhancement component 607 generates a noise vector $\delta(b)$ using the trained generator model 605. The noise vector $\delta$ is then added 609 to the signal x(b) to form an enhanced waveform $x'(b)=x(b)+\delta(b)$. The enhanced waveform x'(b) is provided as input to the transmitter hardware of the transmitting device.

In an example embodiment, the magnitude of the noise vector $\delta(b)$ may be bounded to a small value to minimize the distortion introduced in the signal. Using this noise vector allows the discriminatory power of the original signal x(b) to be maximized with respect to other transmitters. This enhanced waveform undergoes non-linear transformations as a result of differences in transmitter hardware, such as non-linearity in power amplifiers, mixers and other active circuit devices. In other words, the signature of the transmitter embedded in the signal output by the transmitter is a function of both the signal as well as the noise vector added to the signal. In this way, when the signal is received by a receiver it may continue to be classified correctly by the receiver since only a minimum amount noise has been added, yet the sensitivity of the noisy sample makes it very difficult for other transmitters to replicate the transmitter signature.

For example, consider a man-in-the-middle attack where an eavesdropper is trying to replicate a signature of a transmitting device. For these types of attacks it is necessary that the eavesdropper's device replicates the transmitting device's signature. In other words, the eavesdropper's device would need to generate a noise vector, c, that when subjected to non-linearity effects of the transmitter of the eavesdropper's device produces the same signature that is produced by the hardware of the outside party's device on the noise vector $\delta$.

It is noted that in some example embodiments, the device that uses the trained generator model (such as a transmitting device for example) and/or the device that uses the discriminator models (such as receiving device for example) may be a different device(s) than a training device that performs the training of the model(s). In some example embodiments, the trained generator and/or discriminator models are distributed to a receiving device and/or transmitting device. Distributing the models may be performed by transferring, transmitting, storing, and/or the like.

As an example, assume a transmitting device is a low-power sensor, and a training device includes a capability to connect to the sensor hardware (e.g. via wired connection) in such a way to introduce noise to signals that are to be input to a transmitter of the sensor. A signal may be processed in the sensor hardware before it is ready to be transmitted, and the noise can be added in one of the stages of the processing pipeline, hence introducing non-linearities to both in the acquired signal and the added noise due to the sensor hardware. The training device may then acquire the signal output by the sensor, and use the outputted signal to train the discriminator and generator models that are specific to that sensor. When the discriminator and generator models are trained, the models could be exchanged between the different communicating entities. In this way, a generator model is used to learn the best encoding scheme for the transmitter of the sensor, and the discriminator model acts as a "key" that can be used to decode the noise augmented input signal. In this example, the discriminator model would be a binary classifier that can identify membership, i.e., whether a signal output by the sensor belongs to class A or the complement of class A, where A is the identifier of the source sensor. In some examples, the training process may be repeated at pre-specified intervals to continuously adapt the generator and the discriminator models to changes in the characteristics of the other devices in the network.

Figure 7:
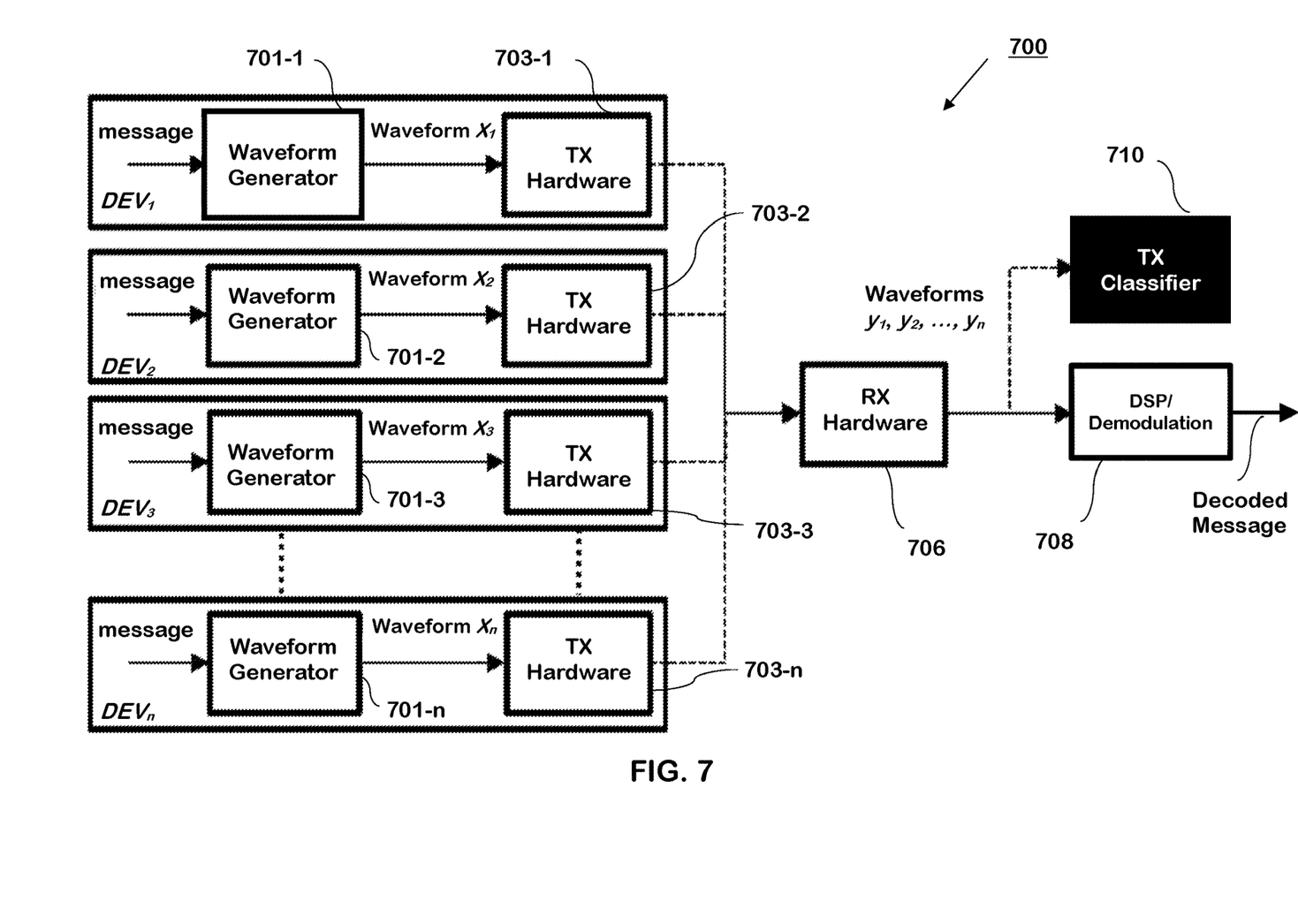
FIG. 7 shows another example embodiment of the subject matter described herein.

Referring now to FIG. 7, this figure is a simplified block diagram of a system 700 according to an example embodiment. In this example, system 700 shows a number of devices (i.e. $DEV_1$, $DEV_2$, $DEV_3$, . . . , $DEV_n$). In this example, each of the devices include a waveform generator (i.e. waveform generator 701-1, 701-2, 701-3, . . . , 701-n) and TX hardware (i.e. 703-1, 703-2, 703-3, . . . , 703-n). Each waveform generator is trained (such as described above with respect to FIG. 5 for example) to generate unique signatures for the respective TX hardware. For example, waveform generator 701-1 is trained to generate unique signatures for TX hardware 703-1. In particular, the waveform generator 701-1 synthesizes noise and add the noise to a message to generate an enhanced waveform $x_1$. Similarly, waveform generators 701-2, 701-3, . . . , 701-$n$ each synthesize noise that is added to the messages to generate waveforms $x_1, x_2, x_3, \ldots, x_n$, respectively. The waveforms $x_1, x_2, x_3, \ldots, x_n$ may be transmitted by the TX hardware 703-1, 703-2, 703-3, . . . , 703-$n$, respectively. Each of $x_1, x_2, x_3, \ldots, x_n$ undergo non-linear transformations that are unique to their respective TX hardware 703-1, 703-2, 703-3, . . . , 703-$n$. The transmitted signals are received at RX Hardware 706 as waveforms $y_1, y_2, y_3, \ldots, y_n$. The waveforms $y_1, y_2, y_3, \ldots, y_n$ are provided as input to waveform classifier 710. The waveform classifier 710 is able to authenticate whether the waveforms $y_1, y_2, y_3, \ldots, y_n$ were actually sent by their respective devices using trained GAN discriminators. For example, waveform classifier 710 may include trained GAN discriminators for each transmitter (i.e. TX hardware 703-1, 703-2, 703-3, . . . , 703-$n$), which may be trained, for example, as described above with respect to FIG. 5 for example.

In other words, a GAN generator for a given transmitter generates noise that acts as a private key for that transmitter where the corresponding trained GAN discriminator acts as a public key for that transmitter.

Figure 8:
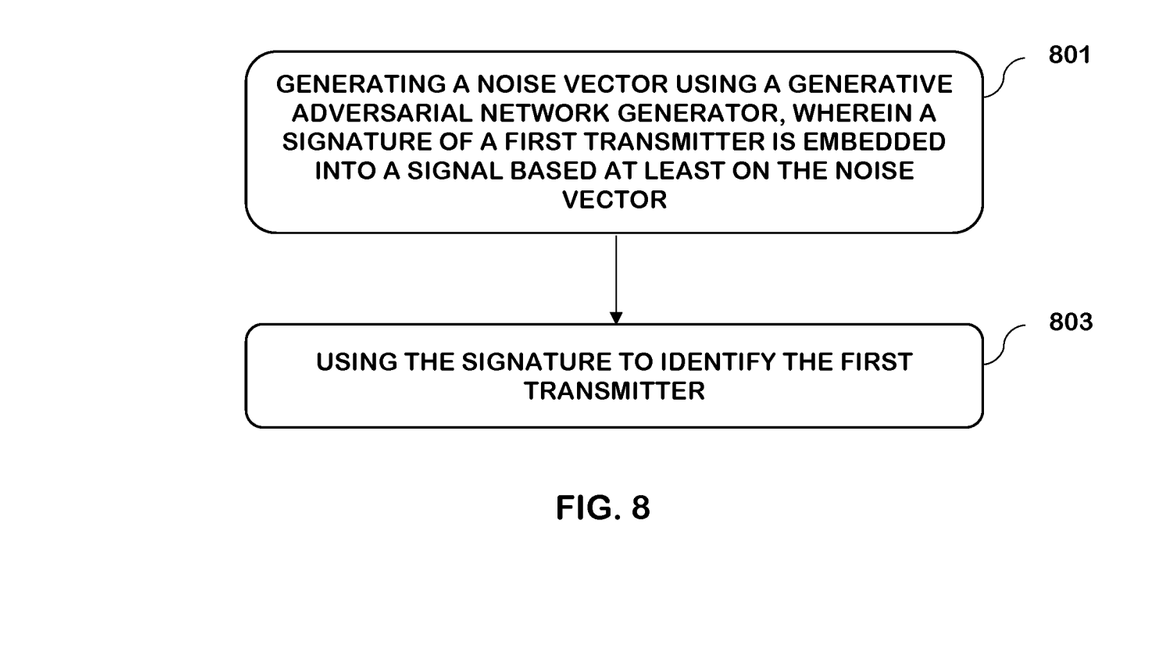
FIG. 8 shows a further example embodiment of the subject matter described herein.

FIG. 8 is a logic flow diagram for robust transmitter authentication using Generative Adversarial Networks. This figure further illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 8 are assumed to be performed by a device such as device 102 for example.

According to an example embodiment (which may be referred to as example 1), a method for transmitter authentication is provided including: generating a noise vector using a generative adversarial network generator model, wherein a signature of a first transmitter is embedded into a signal output by the first transmitter based at least on the noise vector as indicated by block 801; and using the signature to identify the first transmitter as indicated by block 803.

Another example embodiment (which may be referred to as example 2), is a method as in example 1, wherein the signature of the first transmitter is based on a combination of the noise vector, and one or more hardware characteristics of the first transmitter.

Another example embodiment (which may be referred to as example 3), is a method as in example 2, wherein the one or more hardware characteristics are unique to the first transmitter and comprise one or more non-linear transfer function characteristics.

Another example embodiment (which may be referred to as example 4), is a method as in example 1, further comprising: training at least one generative adversarial network discriminator model to distinguish between signatures created by the first transmitter and signatures created by at least one second transmitter.

Another example embodiment (which may be referred to as example 5), is a method as in example 4, further comprising: training the generative adversarial network generator model jointly with the at least one generative adversarial network discriminator model by at least generating the noise vector based on an iterative technique where noise is added to samples of data known to be associated with the first transmitter such that a class boundary of the at least one adversarial network is restricted with each iteration.

Another example embodiment (which may be referred to as example 6), is a method as in example 5, wherein the noise is added in a direction of a gradient of a generator cost function.

Another example embodiment (which may be referred to as example 7), is a method as in example 6, wherein the noise added is a minimum amount of noise which enables the generative adversarial network discriminator model to continue to discriminate between the first transmitter and the at least one second transmitter.

Another example embodiment (which may be referred to as example 8), is a method as in example 5, further comprising distributing the at least one trained generative adversarial network discriminator model to one or more devices for authenticating signals output by the first transmitter, wherein the one or more devices are separate from a device comprising the first transmitter.

According to another example embodiment (which may be referred to as example 10), a computing system is provided including one or more memories comprising computer-readable code; one or more processors, wherein the one or more processors are configured, in response to execution of the computer-readable code, to cause the computing system to at least: generate a noise vector using a generative adversarial network generator model, wherein a signature of a first transmitter is embedded into a signal output by the first transmitter based at least on the noise vector; and use the signature to identify the first transmitter.

Another example embodiment (which may be referred to as example 11), is a computing system as in example 10, wherein the computing system is caused to perform a method as in any one of examples 2 to 8.

According to another example embodiment (which may be referred to as example 12), a computer program product for transmitter authentication is provided. The computer program product comprises a computer readable storage medium having program instructions embodied therewith, the program instructions executable by a device to cause the device to: generate a noise vector using a generative adversarial network generator model, wherein a signature of a first transmitter is embedded into a signal output by the first transmitter based at least on the noise vector; and use the signature to identify the first transmitter.

Another example embodiment (which may be referred to as example 13), is a computer program product as in example 12, wherein the one or more processors are configured, in response to execution of the computer-readable code, to cause the computing system to at least: a method as in any one of examples 2 to 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transmitter authentication comprising:
generating noise vectors using a generative adversarial network generator model, wherein signatures of a first transmitter are embedded into signals output by the first transmitter based at least on the noise vectors, and the signatures of the first transmitter are based on combinations of the noise vectors and one or more hardware characteristics of the first transmitter;
training at least one generative adversarial network discriminator model to distinguish between signatures created by the first transmitter and signatures created by at least one second transmitter to create at least one trained generative adversarial network discriminator model, wherein the signatures from the first and at least one second transmitters and the training enable the at least trained one generative adversarial network discriminator model to distinguish signatures created by the first transmitter from the signatures created by the at least one second transmitter; and using a signature to identify the first transmitter.

2. The method as in claim 1, wherein the one or more hardware characteristics are unique to the first transmitter and comprise one or more non-linear transfer function characteristics.

3. The method as in claim 1, wherein the training further comprises:

training the generative adversarial network generator model jointly with the at least one generative adversarial network discriminator model by at least generating the noise vectors based on an iterative technique where noise is added to samples of data known to be associated with the first transmitter such that a class boundary of the at least one adversarial network is restricted with iterations.

4. The method as in claim 3, wherein the noise is added in a direction of a gradient of a generator cost function.

5. The method as in claim 4, wherein the noise added is a minimum amount of noise which enables the generative adversarial network discriminator model to continue to discriminate between the first transmitter and the at least one second transmitter.

6. The method as in claim 3, further comprising distributing the at least one trained generative adversarial network discriminator model to one or more devices for authenticating signals output by the first transmitter, wherein the one or more devices are separate from a device comprising the first transmitter.

7. A computing system, comprising:

one or more memories comprising computer-readable code;

one or more processors, wherein the one or more processors are configured, in response to execution of the computer-readable code, to cause the computing system to at least:

generate noise vectors using a generative adversarial network generator model, wherein signatures of a first transmitter are embedded into signals output by the first transmitter based at least on the noise vectors, and the signatures of the first transmitter are based on combinations of the noise vectors and one or more hardware characteristics of the first transmitter;

train at least one generative adversarial network discriminator model to distinguish between signatures created by the first transmitter and signatures created by at least one second transmitter to create at least one trained generative adversarial network discriminator model, wherein the signatures from the first and at least one second transmitters and the training enable the at least trained one generative adversarial network discriminator model to distinguish signatures created by the first transmitter from the signatures created by the at least one second transmitter; and use a signature to identify the first transmitter.

8. The computing system as in claim 7, wherein the one or more hardware characteristics are unique to the first transmitter and comprise one or more non-linear transfer function characteristics.

9. The computing system as in claim 7, wherein further the computing system is further caused, during the training, to:

train the generative adversarial network generator model jointly with the at least one generative adversarial network discriminator model by at least generating the noise vectors based on an iterative technique where noise is added to samples of data known to be associated with the first transmitter such that a class boundary of the at least one adversarial network is restricted with iterations.

10. The computing system as in claim 9, wherein the noise is added in a direction of a gradient of a generator cost function.

11. The computing system as in claim 10, wherein the noise added is a minimum amount of noise which enables the generative adversarial network discriminator model to continue to discriminate between the first transmitter and the at least one second transmitter.

12. The computing system as in claim 9, further comprising distributing the at least one trained generative adversarial network discriminator model to one or more devices for authenticating signals output by the first transmitter, wherein the one or more devices are separate from a device comprising the first transmitter.

13. A computer program product for transmitter authentication, the computer program product comprising: a non-transitory computer readable storage medium having program instructions embodied therewith, the program instructions executable by a device to cause the device to:

generate noise vectors using a generative adversarial network generator model, wherein signatures of a first transmitter are embedded into signals output by the first transmitter based at least on the noise vectors, and the signatures of the first transmitter are based on combinations of the noise vectors and one or more hardware characteristics of the first transmitter;

train at least one generative adversarial network discriminator model to distinguish between signatures created by the first transmitter and signatures created by at least one second transmitter to create at least one trained generative adversarial network discriminator model, wherein the signatures from the first and at least one second transmitters and the training enable the at least trained one generative adversarial network discriminator model to distinguish signatures created by the first transmitter from the signatures created by the at least one second transmitter; and use a signature to identify the first transmitter.

14. The computer program product as in claim 13, wherein the one or more hardware characteristics are unique to the first transmitter and comprise one or more non-linear transfer function characteristics.

* * * * *